United States Patent Office 3,642,680
Patented Feb. 15, 1972

3,642,680
ETHYLENE-VINYL ACETATE COPOLYMER LATEX PREPARED WITH ACRYLIC SEED
Brian Edmund Jennings, Digswell, Welwyn, William Louis Wallet Ludekens, Bracknell, and Robert Edward Slater, Welwyn, England, assignors to Imperial Chemical Industries Limited, London, England
No Drawing. Filed Aug. 21, 1968, Ser. No. 754,455
Claims priority, application Great Britain, Sept. 8, 1967, 41,181/67
Int. Cl. C09d 5/02
U.S. Cl. 260—29.6
4 Claims

ABSTRACT OF THE DISCLOSURE

Vinyl acetate and ethylene are polymerised in an emulsion of a small amount of a seed polymer obtained by copolymerising an ester or nitrile of methacrylic or acrylic acid, optionally with a polymerisable carboxylic acid.

---

The present invention relates to copolymers of vinyl acetate and particularly to a process for making copolymers of vinyl acetate and ethylene.

The use of polymers and copolymers of vinyl acetate in such applications as pigment binders in paints is well known. Although the use of various copolymers of vinyl acetate and ethylene would offer advantages in such applications, there are difficulties in making these copolymers.

It is an object of this invention to provide a process for making copolymers of vinyl acetate and ethylene in latex form, which are particularly useful as pigment binders in pigment film forming applications, e.g. as in paints and paper coating compositions, both of which are pigment loaded compositions.

Accordingly the present invention provides a process in which at least one monomer (A) is polymerized while dispersed as an emulsion in an aqueous phase in the presence of a polymerisation catalyst, said monomer (A) being selected from the group consisting of the esters of acrylic and methacrylic acids containing from 1 to 8 carbon atoms in the alkyl moiety of the ester and the nitriles of said acids, optionally in the presence of at least one monomer (B) selected from the group consisting of mono-ethylenically unsaturated polymerisable carboxylic acids or amides or anhydrides of such acids, preferably at a pressure not greater than 12 atmospheres, thereafter there is then introduced into the reaction medium containing the polymeric product, vinyl acetate and ethylene which are caused to polymerise in the presence of said polymeric product, the pressure of the ethylene being maintained at a value greater than 12 atmospheres, the amount of said monomer (A) initially present being from 1 to 20% and of said monomer (B), if present, from 0.5 to 5% each by weight of the weight of vinyl acetate subsequently added, and the weight of copolymerised ethylene being from 5 to 12% by weight, based on the weight of copolymerised vinyl acetate.

The present invention further provides a process in which vinyl acetate and ethylene are caused to polymerise in the presence of a previously prepared aqueous dispersion of the polymeric product, preferably obtained by polymerising at a pressure not greater than 12 atmospheres, while dispersed as an emulsion in an aqueous phase in the presence of a polymerisation catalyst at least one monomer (A) selected from the group consisting of the esters of acrylic and methacrylic acids containing from 1 to 8 carbon atoms in the alkyl moiety of the ester, and the nitriles of said acids, optionally in the presence of at least one monomer (B) selected from the group consisting of mono-ethylenically unsaturated polymerisable carboxylic acids or amides or anhydrides of such acids, the ethylene being maintained at a pressure greater than 12 atmospheres, the amount of said monomer (A) used to form said polymeric product being from 1 to 20% and of said monomer, (B), if present, from 0.5 to 5% each by weight of the weight of vinyl acetate added to said emulsion, and the weight of copolymerised ethylene being from 5 to 12% by weight of the weight of copolymerised vinyl acetate.

In preparing the polymer of monomer (A), or the copolymer of monomers (A) and (B), it is advantageous to use a maximum pressure of 3 atmospheres, particularly where the final polymer latex is to be used in the preparation of paper coating compositions.

Examples of monomer (A) include methyl methacrylate, ethyl acrylate, 2-ethyl hexyl acrylate, acrylonitrile and methacrylonitrile. It is preferred to use 5 to 15% of monomer (A) by weight of vinyl acetate. Examples of monomer (B) include methacrylic acid, acrylic acid, fumaric acid, maleic acid, itaconic acid, methacrylamide and maleic anhydride. We prefer to include the use of a monomer (B) in a latex for paper coating because it improves qualities of the final latex, for instance it improves the stability of the latex when only a small amount of emulsifier is used and improves the compatibility of the latex with starch.

In preparing the polymer of monomer (A) or the copolymer of monomers (A) and (B), any convenient temperature can be used, but we prefer to use a temperature of 70 to 90° C. In polymerising the vinyl acetate and ethylene any convenient temperature can be used, but we prefer to carry out this step at from 70 to 90° C.

It is preferred that the pH of the system should be maintained at from 4 to 5 during the polymerisation of the vinyl acetate and ethylene so as to avoid any tendency for the vinyl acetate, or the final copolymer, to hydrolyse. The pH is controlled in conventional manner, e.g. by including in the aqueous phase a small amount of sodium carbonate, sodium dihydrogen phosphate or borax.

The catalyst used for the polymerisation of monomer (A) or the mixture of monomers (A) and (B) should be a catalyst causing emulsion polymerisation. These are generally water soluble. The amount required is that which will give over 90% conversion to polymer within a reasonable period of time, e.g. within about 3 hours. The amount that is generally effective is from 0.05 to 1.0% by weight, based on the weight of monomer (A) or of the mixture of monomers (A) and (B). Examples of catalysts that may be used include ammonium or potassium persulphate. The catalysts may be activated in known manner, e.g. by the presence of a reducing agent.

The vinyl acetate can be added to the reaction medium as a single addition immediately at the beginning of the copolymerisation process of the vinyl acetate and ethylene, or it can be added incrementally or continuously throughout that process. Further catalyst is normally added to ensure rapid polymerisation of these monomers and this is relevant to the molecular weight of the copolymer formed from them. It is preferred that the catalyst should be added proportionately with the vinyl acetate, although if the vinyl acetate is added all at once, we prefer to add the catalyst incrementally or continuously. The preferred amount of catalyst is from 0.1 to 0.5 part by weight per 100 parts by weight of vinyl acetate. As for the polymerisation involving a monomer (A), the catalyst used should be one which causes emulsion polymerisation and is therefore generally a water soluble catalyst, examples of which include ammonium or potassium persulphate.

In general the amount of ethylene that enters into the copolymer is controlled by the pressure of the ethylene, and the agitation/equilibration process. We prefer to operate our process without the use of very high ethylene pressures because of the mechanical problems this causes. Preferably ethylene pressures not greater than 100 atmospheres are used.

The aqueous phase both in the polymerisation involving a monomer (A), and in the polymerisation of the vinyl acetate and ethylene contains an emulsifier in order to provide a stable emulsion. It is preferred that the emulsifier is an anionic emulsifier. It is also preferred that it is one that has a low critical micelle concentration, e.g. the alkali metal salts of dialkyl substituted sulpho succinic acid, and the alkali metal salts of dialkyl-diphenyl ether disulphonic acid. Other emulsifying agents which alternatively or in addition may be used include the alkali metal salts of sulphated calsolene oil, the alkali metal salts of alkyl substituted benzene sulphonates and the alkali metal salts of sulphated long chain aliphatic alcohols. For certain applications of the polymer latex, e.g. in paints, it may be desirable to add non-ionic emulsifying agents (examples of which are condensates of ethylene oxide with phenols and block copolymers of ethylene oxide and propylene oxide) in addition to the anionic emulsifying agents, and also protective colloids, for instance hydroxyethyl cellulose.

The copolymer emulsions of this invention have particular value as pigment binders in paints where they have good scrub resistance and low water sensitivity, and as pigment binders in paper coating compositions. For use in paper coating compositions, it is preferred that the total amount of added emulsifier present in the aqueous phase during the polymerisation of the vinyl acetate and ethylene should be from 0.05 to 0.5% by weight, based on the total weight of vinyl acetate and the polymeric product of the polymerisation involving a monomer (A). For best performance in paper coating compositions this amount of emulsifier is preferably less than 0.3% by weight based on the total weight of vinyl acetate and the polymeric product of the polymerisation involving a monomer (A).

The copolymer emulsions are used as pigment binders in emulsion paints in the same way as polyvinyl acetate emulsions are used for the same purpose. Similarly in paper coating compositions the copolymer emulsion is used in the same way as the well known butadiene/styrene copolymers are used, i.e. as partial or complete replacements for the conventional pigment binders starch, casein or soya protein.

The invention is illustrated by the following examples in which all parts are expressed by weight.

EXAMPLE 1

In a 5 litre stainless steel reaction vessel provided with a stirrer, was introduced 0.6 part sodium carbonate, 0.3 part sodium dioctyl sulphosuccinate, 0.4 part ammonium persulphate and 120 parts distilled water. The vessel was sealed and was purged with nitrogen and heated to 80 to 83° C. A mixture of 1 part acrylic acid and 10 parts methyl methacrylate was pumped into the vessel over a period of about 15 minutes, against a pressure of 1 atmosphere. The supply of monomers was then interrupted for about 30 minutes to complete the reaction. The vessel was then pressurised with ethylene to about 27 atmospheres and 89 parts vinyl acetate and 0.3 part ammonium persulphate (as 3.0% solution in water) were pumped in at such a rate as to maintain the temperature at 80 to 83° C. This took about 3 hours. The pressure was kept at 27 atmospheres by periodic injection of further ethylene. On completion of the monomer addition the reaction mixture was maintained at 27 atmospheres and 80° C. until the residual vinyl acetate was less than 0.5%. This took about 1 hour. On cooling and venting the excess of ethylene, a stable emulsion having a solids content of ca. 45.0% was obtained. The copolymer latex was found to have the following properties:

(1) The copolymer contained 22.8% (molar) of ethylene as determined by infra-red analysis of purified polymer.
(2) Particle size 0.17 to 0.23$\mu$.
(3) Viscosity 16 cp.
(4) The latex was stable to mechanical shear.
(5) Only traces of entrained coagulum on a 300# sieve and no build up in the reaction vessel.

EXAMPLE 2

Example 1 was repeated but in place of methyl methacrylate, 10 parts of ethyl acrylate were used. The resulting latex was found to have the following properties:

(1) Solids content 46.0%.
(2) Particle size 0.14 to 0.23$\mu$.
(3) Viscosity 20 cp.
(4) The latex was stable to mechanical shear.
(5) Only traces of entrained coagulum and no build up was found in the reaction vessel.
(6) The copolymer contained 23.3% molar of ethylene.

EXAMPLE 3

Example 1 was repeated but 5 parts methyl methacrylate were used. The resulting latex was found to have the following properties.

(1) Solids content 45.5%.
(2) Particle size 0.18–0.24$\mu$.
(3) Viscosity 20 cp.
(4) The latex was stable to mechanical shear.
(5) Only traces of entrained coagulum and no build up was found in the reaction vessel.
(6) The copolymer contained 21.2% molar of ethylene.

EXAMPLE 4

For comparative purposes a latex was prepared having a similar composition to Example 1 but omitting the seed stage.

To a 5 litre stainless steel reaction vessel provided with a stirrer was introduced 0.1 part sodium dioctyl sulphosuccinate; 0.5 part ammonium persulphate and 120 parts distilled water. The vessel was sealed, purged with nitrogen, heated to 80–83° C. and pressurised to about 27 atmospheres with ethylene. Then a mixture of 1 part acrylic acid, 10 parts methyl methacrylate and 89 parts vinyl acetate and 0.3 part ammonium persulphate (as a 3.0% solution in water) were pumped in at such a rate as to maintain the temperature at 80–83° C. This took about 3 hours. The pressure of ethylene was kept at 27 atmospheres by periodic injection of further ethylene. On completion of the monomer addition the reaction mixture was maintained at 27 atmospheres and 80° C. until the residual monomer was less than 0.5%. This took about 1 hour. On cooling and venting the excess of ethylene a stable emulsion having a solids content of ca. 45.5% was obtained. The resulting latex was found to have the following properties:

(1) Particle size 0.16–0.21$\mu$.
(2) Viscosity 18 cp.
(3) The latex was stable to mechanical shear.
(4) Only traces of entrained coagulum and no build up was found in the reaction vessel.
(5) The copolymer contained 23.2% molar of ethylene.

The copolymer lactices were compounded in the following clay/starch paper coating mix.

| Formulation: | Parts dry weight |
|---|---|
| Clay | 100 |
| Starch | 12.5 |
| Latex | 12.5 |
| Solids content | 40% |

PROPERTIES OF COATED PAPER

| Example: | Pick strength, ft./min. | Gloss, percent | Brightness, percent |
|---|---|---|---|
| 1 | 235 | 64 | 85 |
| 2 | 200 | 63 | 84 |
| 3 | 230 | 64 | 84 |
| 4 | 0 | 63 | 84 |

Pick strengths were determined on the I.G.T. Printability Tester Type A1S using low viscosity oil and spring drive A.

EXAMPLE 5

Into a 5 litre stainless steel reaction vessel provided with a stirrer, was introduced a solution containing 1222 parts of water, 25.5 parts hydroxy ethyl cellulose, 11.6 parts sodium dioctyl sulphosuccinate, 51.5 parts non-ionic surfactant based on block copolymer of ethylene oxide/propylene oxide and 2.7 parts of sodium carbonate, together with 88.0 of methyl methacrylate. The vessel was purged with nitrogen, sealed and heated to 80°–82° C. 0.7 part of ammonium persulphate were added as 30 parts of aqueous persulphate solution and reacted for 30 minutes. After destroying the residual initiator by raising the temperature to 90° C., the temperature was reduced to 85°–87° C. 1570 parts of vinyl acetate were added and the vessel pressurized to 400 p.s.i. with ethylene. 100 parts of aqueous ammonium persulphate solution containing 2.4 parts ammonium persulphate was added over 2½ hours, the batch temperature being controlled at 85°–87° C. and the pressure maintained at 400 p.s.i with ethylene. The reaction mixture was maintained at the given temperature and pressure for a further 20 minutes. On cooling and venting the excess of ethylene, a stable emulsion having a solids content of ca. 55% was obtained.

The copolymer latex was found to have the following properties:

(1) The copolymer contained 9.4% by weight of ethylene as determined by infra-red analysis.
(2) pH of 4.0.
(3) Viscosity 1.9 poises at 25° C.
(4) Minimum film-forming temperature of 5.8° C.
(5) Glass transition temperature of 14° C.
(6) Good stability to mechanical shear.

EXAMPLES 6, 7, 8 AND 9

Example 5 was repeated using in one case 2% (35.2 parts), in another 1% (17.6 parts) and in another 10% (176 parts) of methyl methacrylate instead of 5% (88 parts). It was also repeated with the vinyl acetate fed over 2½ hours in a similar manner to the persulphate initiator. In this last case, as in Example 5, 5% (88 parts) methyl methacrylate seed was used. Similar stable latices were obtained without build up in the reaction vessel.

Latices so made can be used in the formulation of emulsion paints. Paints have been made in the pigment volume range 30%–45% using pigments, extenders, dispersants etc., as is normal in the industry.

We claim:

1. A process for making a copolymer of vinyl acetate and ethylene in latex form which comprises copolymerizing vinyl acetate and ethylene in the presence of a previously prepared aqueous dispersion consisting essentially of the polymeric product obtained by polymerizing, while dispersed as an emulsion in an aqueous phase in the presence of an effective amount of a water-soluble, free-radical polymerization catalyst, at least one monomer (A) selected from the group consisting of the esters of acrylic and methacrylic acids containing from 1 to 8 carbon atoms in the alkyl moiety of the ester, and the nitriles of said acids, optionally in the presence of at least one monomer (B) selected from the group consisting of mono-ethylenically unsaturated polymerizable carboxylic acids or amides, or anhydrides of such acids, the ethylene being maintained at a pressure of from 12 to 100 atmospheres, the amount of said monomer (A) used to form said polymeric product being from 1 to 20% and of said monomer (B), if present, from 0.5 to 5% each by weight of the weight of vinyl acetate added to said emulsion, and the weight of copolymerized ethylene being from 5 to 12% by weight of the weight of copolymerized vinyl acetate.

2. A process according to claim 1 in which monomer (A) is methyl methacrylate.

3. A process according to claim 1 in which at least one monomer (A) is copolymerized with at least one monomer (B) and an emulsifier is present in copolymerizing the vinyl acetate and ethylene in an amount of from 0.05 to 0.3% by weight of the total weight of vinyl acetate and of the polymeric product of the polymerization involving a monomer (A).

4. A process as claimed in claim 1 wherein said polymeric product is obtained by polymerizing said monomer (A) and, if used, said monomer (B) at a pressure of from 1 to 12 atmospheres.

References Cited
UNITED STATES PATENTS

| 3,177,172 | 4/1965 | Adams | 260—29.6 TA |
| 3,215,678 | 11/1965 | Adelman | 260—80.8 |
| 3,296,170 | 1/1967 | Burkhart et al. | 260—80.8 X |

JULIUS FROME, Primary Examiner

D. A. JACKSON, Assistant Examiner

U.S. Cl. X.R.

260—29.6 RW, 29.6 R, 878 R, 17.4 ST; 117—155 UA